United States Patent
Gouby

(10) Patent No.: US 9,482,597 B2
(45) Date of Patent: Nov. 1, 2016

(54) METHOD AND A DEVICE FOR NORMALIZING VALUES OF OPERATING PARAMETERS OF AN AEROENGINE

(71) Applicant: SNECMA, Paris (FR)

(72) Inventor: Aurelie Gouby, Quincy sous Senart (FR)

(73) Assignee: SNECMA, Paris, NY (US)

( * ) Notice: Subject to any disclaimer, the term of this patent is extended or adjusted under 35 U.S.C. 154(b) by 119 days.

(21) Appl. No.: 14/478,286

(22) Filed: Sep. 5, 2014

(65) Prior Publication Data

US 2015/0268131 A1 Sep. 24, 2015

(30) Foreign Application Priority Data

Sep. 5, 2013 (FR) ..................... 13 58520

(51) Int. Cl.
| | |
|---|---|
| *F02C 9/00* | (2006.01) |
| *G01M 15/14* | (2006.01) |
| *G05B 23/02* | (2006.01) |
| *G07C 3/02* | (2006.01) |

(52) U.S. Cl.
CPC .......... *G01M 15/14* (2013.01); *G05B 23/0221* (2013.01); *G07C 3/02* (2013.01)

(58) Field of Classification Search
USPC ............. 706/17; 600/481; 702/189; 701/100
See application file for complete search history.

(56) References Cited

U.S. PATENT DOCUMENTS

| | | | |
|---|---|---|---|
| 6,466,858 B1 * | 10/2002 | Adibhatla et al. ............ | 701/100 |
| 2011/0307431 A1 | 12/2011 | Lacaille | |
| 2012/0046896 A1 | 2/2012 | Flandrois et al. | |

FOREIGN PATENT DOCUMENTS

| | | |
|---|---|---|
| EP | 2 376 988 | 10/2011 |
| FR | 2 963 960 A1 | 2/2012 |
| WO | 2010/076468 A1 | 7/2010 |

OTHER PUBLICATIONS

French Preliminary Search Report issued Apr. 23, 2014, in Patent Application No. FR 1358520, filed Sep. 5, 2013 (with English Translation of Category of Cited Documents).

N D Rostand, et al., "Enhanced Massive Visualization of Engines Performance", $25^{th}$ International Congress on Condition Monitoring and Diagnostic Engineering, Journal of Physics: Conference Series, vol. 364, No. 1, XP 020223090, May 28, 2012, 16 pages.

Jerome Lacaille, "Standardized Failure Signature for a Turbofan Engine", Aerospace Conference, XP 031450255, Mar. 7, 2009, pp. 1-8.

James Schimert, et al., "Coupling a Dynamic Linear Model with Random Forest Regression to Estimate Engine Wear", Annual Conference of the Prognostics and Health Management Society, XP 55114809, Jan. 2010, 13 pages.

* cited by examiner

*Primary Examiner* — Adam Tissot
(74) *Attorney, Agent, or Firm* — Oblon, McClelland, Maier & Neustadt, L.L.P

(57) ABSTRACT

A normalization method includes: normalizing a current value of each operating parameter relative to exogenous variables using a first regression model defined on a space generated by the exogenous variables; associating the vector formed by the normalized current values of the parameters with at least one vector class of a set of predefined classes; using at one second regression model defined on the space generated by the exogenous variables for the at least one class associated with the vector to construct, for each parameter, a third regression model onto the space; and normalizing the normalized current value of each parameter relative to the exogenous variables using the third regression model.

11 Claims, 3 Drawing Sheets

METHOD AND A DEVICE FOR NORMALIZING VALUES OF OPERATING PARAMETERS OF AN AEROENGINE

BACKGROUND OF THE INVENTION

The invention relates to the general field of aviation, and in particular to monitoring aeroengines (i.e. aircraft engines), such as turbine engines, for example.

The invention relates more particularly to a method of normalizing a value of an operating parameter of an aeroengine for use when monitoring the engine.

In the aviation industry, it is essential for a manufacture of aeroengines to master the behavior of those engines in order to demonstrate in particular the manufacturer's design and maintenance capabilities. Such mastery over the behavior of each engine relies in general on experts analyzing the values taken by a selection of operating parameters of the engine that are representative of its state at any given instant and that are determined on the basis of measurements provided by sensors for monitoring the engine. By way of example, such operating parameters may comprise the speed of the engine, its temperature, or indeed its pressure. They may also result from grouping together more elaborate indicators that are specific to a particular physical element of the engine or to a logical element for performing a specific task (e.g. starter system, lubrication system), such as details or shapes of a curve representative of the way measurements delivered by one or more engine monitoring sensors vary over time.

A difficulty encountered by experts when analyzing values of such operating parameters stems from the fact that a given engine never operates under exactly the same conditions from one mission to another, or indeed even during a single mission. In other words, the values of the operating parameters analyzed by experts result from measurements acquired under conditions that differ, in particular in terms of the environment or the external context (e.g. external temperature, atmospheric pressure, speed and altitude of the aircraft propelled by the engine, geographical location, weather conditions, etc.), thus making it difficult to compare such values with one another for the purpose in particular of detecting a failure of the engine or behavior that is abnormal. In the description below, the term "exogenous variables" or "context variables" are used to designate the various variables representing the external context and that might have an influence on the operating parameters of the engine.

Unfortunately, continuously monitoring operating parameters in order to take those various external contexts into account cannot be envisaged in practice, in particular for reasons of cost and difficulty of implementation.

In order to mitigate that difficulty, it is known to have recourse to so-called "standardization" methods that seek to reduce all of the operating parameter values under study to a standard environment, in particular an environment that is independent of the conditions under which the measurements are actually acquired by the sensors and from which these values are determined. Numerous standardization methods rely on normalizing the values of the operating parameters, i.e. on transforming operating parameter values so that they are distributed with a normal relationship and thus become comparable with one another.

For each operating parameter, conventional normalization consists in evaluating the mean and the standard deviation of a series of values previously collected for that parameter, then in calculating the difference that exists between the mean and the current value of the operating parameter, and then in dividing this difference by the standard deviation. The value as obtained in this way is a normalized value of the operating parameter. Nevertheless, such normalization is not suitable for handling the ways in which the operating parameter values depend on the above-mentioned exogenous variables.

Document EP 2 376 988 describes a method of normalizing a set of indicators that are specific to elements of an aeroengine, which method makes it possible to eliminate the dependencies of those indicators on the external context and to handle the stochastic interdependency relationships between the indicators themselves. That method uses a conditional multidimensional regression model that handles all of the indicators simultaneously while also taking account of a set of exogenous variables.

For each indicator, the definition of that model relies on constructing a projection space on the basis of a set of exogenous variables and of a subset comprising all of the indicators with the exception of the indicator under consideration, and then on using a regression technique to project the real value of the indicator in question onto the projection space as constructed in that way. The projection provides an estimate (i.e. a prediction) of the indicator, which estimate is then subtracted from the real value of the indicator in order to provide a normalized value.

The regression model described in Document EP 2 376 988 is relatively robust, since it is defined from a large panel of data (i.e. of indicator values and of exogenous variables), as collected over a plurality of engines of the same type operating in a mode of operation that is normal (i.e. without any problem).

Nevertheless, under certain circumstances, that model can lack accuracy in the sense that it does not make it possible to take account of the differences that can exist between engines, in particular in terms of age, state during the mission under consideration, or indeed other features specific to each engine on being manufactured.

OBJECT AND SUMMARY OF THE INVENTION

The present invention serves in particular to mitigate this insufficiency by providing a normalization method for normalizing "current" values of N operating parameters of an aeroengine, where N is an integer greater than or equal to 1, these current values being for use in monitoring the aeroengine and being determined on the basis of measurements delivered by sensors of the aeroengine, the normalization method comprising:

a first normalization step of normalizing the current value of each operating parameter relative to a set of exogenous variables representative of an external context having an influence on the operating parameter, with the help of a first regression model defined for this operating parameter on a space generated by this set of exogenous variables;

an association step of associating a vector formed by the normalized current values of the N operating parameters with at least one class of a set of value vector classes predefined for the N operating parameters;

a construction step of constructing, for each operating parameter, a third regression model defined on the space generated by the set of exogenous variables by using at least one second regression model defined on the space generated by the set of exogenous variables for said at least one class associated with the vector; and a second normalization step of normalizing the normalized current value of each operating parameter relative to the set of exogenous variables, with the help of the third regression model constructed for this operating parameter.

Correspondingly, the invention also provides a normalization device for normalizing "current" values of N operating parameters of an aeroengine, where N is an integer greater than or equal to 1, these current values being for use in monitoring the aeroengine and being determined on the basis of measurements delivered by sensors of the aeroengine, the normalization device comprising:

a first normalization module for normalizing the current value of each operating parameter relative to a set of exogenous variables representative of an external context having an influence on the operating parameter, this first module using a first regression model defined for this operating parameter on a space generated by this set of exogenous variables;

an association module suitable for associating a vector formed by the normalized current values of the N operating parameters with at least one class of a set of value vector classes predefined for the N operating parameters;

a construction module suitable for constructing, for each operating parameter, a third regression model on the space generated by the set of exogenous variables by using at least one second regression model defined on the space generated by the set of exogenous variables for said at least one class associated with the vector; and a second normalization module for normalizing the normalized current value of each operating parameter relative to the set of exogenous variables, this second module using the third regression model for this operating parameter as constructed by the construction module.

The invention thus provides effective standardization of the current values of N operating parameters relative to a set of exogenous variables that have an influence on these parameters, by relying on normalizing these values twice. More precisely, the standardization proposed by the invention relies:

on a first normalization of the current values of the N operating parameters with the help of N first generic regression models defined for these parameters on a space generated by the set of exogenous variables and typically constructed from a large panel of data collected over a plurality of missions and for a plurality of distinct aeroengines. This first normalization makes it possible to obtain first normalized values for the operating parameters in which dependency on the exogenous variables, in other words on the external context, has been reduced or limited, or even eliminated; and then on more accurate second normalization with the help of third regression models defined for the N operating parameters likewise on the space generated by the set of the exogenous variables, but on the basis of a few reduced value classes to which the vector constituted by the N first normalized values belongs (or relates) or even on the basis of only one such class. This second normalization serves to take account more effectively of the specific features of the aeroengine that is to be monitored by using the operating parameters under consideration.

Normalizing twice in this way is made possible by the invention by classifying the vector of the first normalized values in one or more value vector classes that are predefined for the N operating parameters and that are appropriately selected using a predetermined resemblance criterion. In other words, the value vector classes that are selected are classes that group together vectors that resemble one another in the meaning of the criterion.

Thus, a given value vector class in the meaning of the invention may group together vectors with neighboring values, i.e. with values that are similar or close in the meaning of a predefined distance or metric for these vectors. Such a classification seeks to minimize a measure of the lack of resemblance between the vectors within each class for a determined number K of classes. Such vector classes can be obtained by applying known supervised or unsupervised classification techniques, preferably to a large amount of data (i.e. to a large number of vectors), such as for example a method of the K closest neighbors or an algorithm relying on a self-organizing map (SOM) such as Kohonen's map, a K-means algorithm, or indeed a hierarchical classification method.

In a variant, a given class of vectors in the meaning of the invention may group together vectors that "share" a common characteristic. Thus, by way of example, the value vectors grouped together within a given class may come from measurements collected on the same engine.

Selecting one resemblance criterion rather than another naturally depends on factors that it is desired to take into account when standardizing the data, and also on the resulting complexity of implementation. Thus, classifying vectors as a function of the engine with which they are associated does not make it possible to take account of the variability in an operating parameter that results from the engine aging. In contrast, unsupervised classification makes it possible to obtain normalization that is more effective and that takes account not only of the aging of the engine, but also of its own specific features.

As emphasized above, the third regression model used during the second normalization step for each operating parameter is more accurate than the first regression model. It is specific to (i.e. defined on) one or a small number of vector classes to which the vector including the value of the operating parameter under consideration belongs. This third model makes it possible, advantageously, to take account of singular features of each engine and of each mission, as compared with the first model which, on the contrary, is relatively generic. The normalization method of the invention nevertheless remains robust by appropriately defining the vector classes, in particular by determining a compromise between the number of classes taken into consideration and the quantity of data available to the manufacturer for defining these classes and for constructing regression models.

In a particular implementation of the invention:

the association step comprises estimating for said at least one class a probability of the vector formed by the normalized current values of these N operating parameters belonging to this class; and the third regression model is constructed from the sum of each second regression model defined for a class and weighted by the probability of the vector formed by the normalized current values of the N operating parameters belonging to this class.

This implementation makes it possible to construct a third model that is even more accurate and more reliable for the second normalization step. Instead of associating the vector formed by the normalized current values of the operating parameters in categoric manner with a single vector class, this implementation makes it possible to take account of a degree of uncertainty concerning the vector class to which the value vector for normalizing belongs. This enables a regression model to be obtained that is more reliable because it is closer to reality.

In another implementation, the first regression models defined for the N operating parameters are constructed during a preliminary training stage from a plurality of observed values of the N operating parameters determined from measurements of sensors in a plurality of aeroengines and collected during at least one mission of those engines.

Furthermore, the preliminary training stage may further comprise, after constructing the first regression models:
- a normalization step of normalizing the plurality of observed values of the operating parameters relative to the set of exogenous variables with the help of the first regression models defined for these operating parameters, this normalization step giving rise to a plurality of vectors of normalized observed values of the N operating parameters;
- a distribution step of distributing these vectors in the set of value vector classes; and
- a construction step of constructing the second regression models defined for each operating parameter and for each class on the basis of vectors of normalized observed values of the operating parameter as distributed in the class.

This implementation of the normalization method makes it possible to obtain regression models that are robust since they are constructed from a large data panel collected over a plurality of engines and/or missions.

In addition, it makes it possible to construct regression models upstream from normalization proper of the current values of the operating parameters. This upstream stage can be performed by a regression model construction device that is distinct from the normalization device, e.g. a device on the ground that possesses calculation and storage resources that are greater than those of the normalization device, which device itself may easily be provided on board the aircraft so as to operate during a mission.

The invention also provides a construction device for constructing regression models for use in normalizing values of N operating parameters of an aeroengine relative to a set of exogenous variables representative of an external context having an influence on the operating parameters, the construction device comprising:
- a construction module for constructing for each operating parameter a first regression model on a space generated by the set of exogenous variables from a plurality of observed values of the operating parameter as determined from measurements of sensors of a plurality of aeroengines and collected during at least one mission of the aeroengines;
- a normalization module for normalizing the plurality of observed values of the N operating parameters relative to the set of exogenous variables with the help of first regression models for these operating parameters as constructed by the construction module, the normalization module being suitable for delivering a plurality of normalized observed value vectors of the N operating parameters;
- a distribution module for distributing these vectors in a set of value vector classes; and
- a construction module for constructing for each value vector class and for each operating parameter a second regression model on the space generated by the set of exogenous variables from the normalized observed value vectors distributed in this class.

In a particular implementation, the distribution step performed during the preliminary training stage makes use of an unsupervised classification method relying on a self-organizing map, resulting in defining the classes of the set of value classes.

Such a method makes it possible in adaptive manner to define value classes that are pertinent in the light of the data panel that is available, and to do so in a reasonably short period of time with relatively little execution complexity.

In a particular implementation, the first and/or second and/or third regression models are linear regression models.

The invention is nevertheless not limited to regression that is linear, and other types of regression that are more complex may be envisaged for even further improving the accuracy of the standardization.

In a particular implementation, the various steps of the normalization method are determined by computer program instructions.

Consequently, the invention also provides a computer program on a data medium, the program being suitable for being performed in a normalization device or more generally in a computer, the program including instructions adapted to perform steps of a normalization method as described above.

The program may use any programming language, and be in the form of source code, object code, or code intermediate between source code and object code, such as in a partially compiled form, or in any other desirable form.

The invention also provides a computer readable data medium including instructions for a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides an aeroengine and in particular a turbine engine including a normalization device of the invention and benefiting from the same above-mentioned advantages as the normalization device.

In yet another aspect, the invention provides a normalization system for normalizing "current" values of N operating parameters of an aeroengine, N being an integer greater than or equal to 1, these current values being for use in monitoring the engine and being determined from measurements delivered by sensors of the engine, the system comprising:
- a construction device of the invention, for constructing first and second regression models for the N operating parameters; and
- a normalization device of the invention, suitable for using the first and second regression models constructed by the construction device to normalize the current values of the N operating parameters.

This system likewise benefits from the same above-mentioned advantages as the normalization device. It may be distributed over two distinct pieces of physical equipment, one hosting the construction device and the other hosting the normalization device (e.g. equipment on the ground such as a computer and equipment on board an aircraft such as an engine computer), or in a variant, the normalization system may be located within a single piece of equipment.

In other implementations and embodiments, it is also possible to envisage that the normalization method, the normalization device, the construction device, the turbine engine, and the system of the invention present in combination all or some of the above-specified characteristics.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF THE INVENTION

Figure 1:
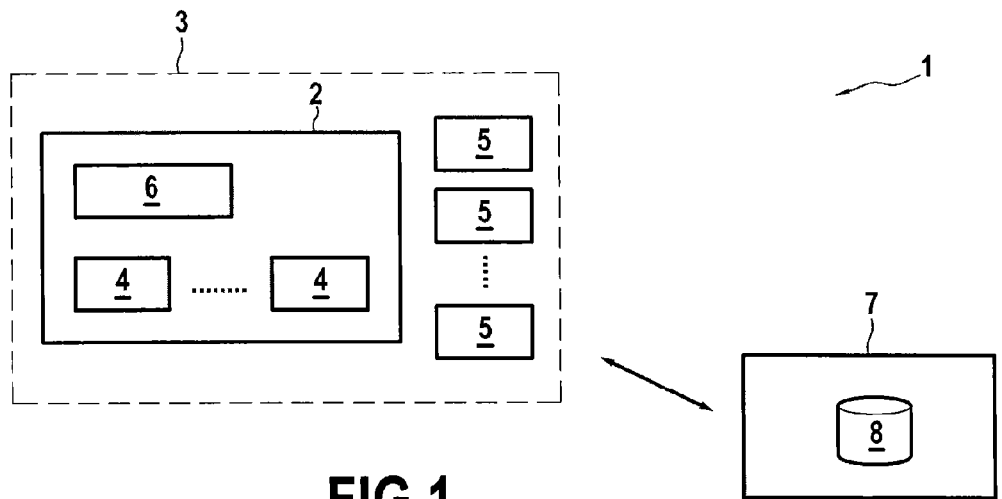
FIG. 1 is a diagram of a turbine engine, a system, a normalization device, and a construction device in accordance with the invention, in particular embodiments.

FIG. 1 shows, in its environment, a particular embodiment of a normalization system 1 in accordance with the invention for normalizing values of operating parameters of an aeroengine.

In the presently-described example, the engine that is to be monitored with the help of operating parameter values as normalized by the system 1 is a turbine engine 2 in accordance with the invention used for propelling an airplane 3. Nevertheless, the invention is not limited to this type of engine nor to this type of aircraft.

Engine monitoring is performed in this example by analyzing normalized values of N operating parameters written P1, P2, . . . , PN, where N≥1, as provided by the normalization system 1. By way of example, these operating parameters are the speed of rotation of the engine 2, its temperature, its pressure, etc., or any other type of parameter representative of the state of the engine 2. In particular, they may be more elaborate operating indicators such as those described in Document EP 2 376 988.

Analysis proper of these parameters in order to monitor the engine is performed using techniques known to the person skilled in the art and not described herein. The description below is restricted to standardizing the values of the operating parameters P1, . . . , PN in order to facilitate analyzing them.

The values of these operating parameters, also referred to as "endogenous" variables, are obtained during each mission of the engine 2 by the normalization system 1 on the basis of measurements delivered by sensors 4 fitted to the engine 2, such as for example a speed sensor, a temperature sensor, etc., and known in themselves.

The airplane 3 is generally provided with a plurality of sensors 5 suitable for operating in parallel and simultaneously with operating parameter values being picked up to measure the current values of a plurality of so-called "exogenous" variables that are written X1, . . . , XL, for L≥1, that are representative of a context external to the engine 2 and that have an influence on the operating parameters P1, P2, . . . , PN. By way of example, these exogenous variables are the temperature of the air outside the airplane 3, atmospheric pressure, the speed of the airplane 3, etc. They may be measured using sensors that are themselves known and that are conventionally fitted to an aircraft such as the airplane 3.

It should be observed that, for simplification purposes, a single set of exogenous variables is taken into consideration for the various operating parameters. Nevertheless, in a variant, it is possible to consider a distinct set of exogenous variables for each operating parameter or for a subset of operating parameters.

In order to normalize the values of the operating parameters P1, P2, . . . , PN, the normalization system 1 comprises:
  a normalization device 6 of the invention that is incorporated in this example in the engine 2, e.g. in the full authority digital engine control (FADEC) computer of the engine 2. This normalization device 6 is in charge of normalizing vectors of so-called "current" values of the parameters P1, . . . , PN that are representative of the state of the engine 2 at various given instants; and
  a construction device 7 in accordance with the invention and included in this example in a device on the ground belonging to an operator in charge of monitoring and maintaining the engine 2 (e.g. the manufacturer of the engine). The construction device 7 is used to construct regression models defined on the space generated by the exogenous variables X1, . . . , XL and also to define classes of value vectors for the operating parameters P1, . . . , PN as a function of a predetermined classification criterion, these models and classes being used by the normalization device 6 each time it normalizes a value vector. For this purpose, the construction device 7 has a large panel of "training" data, i.e. observed values of endogenous and exogenous variables as collected over a plurality of aircraft engines of the same type as the engine 2 over one or more missions of those aircrafts, using sensors such as the sensors 4 and 5 of the airplane 3. This data is stored in a training database 8 of the construction device.

Figure 2A:
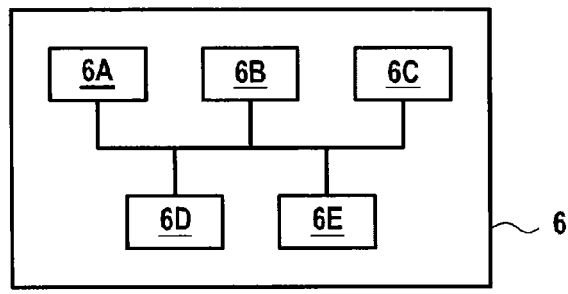
FIGS. 2A and 2B show respectively example hardware architectures for the normalization device and for the construction device of FIG. 1, in particular embodiments.
Figure 2B:
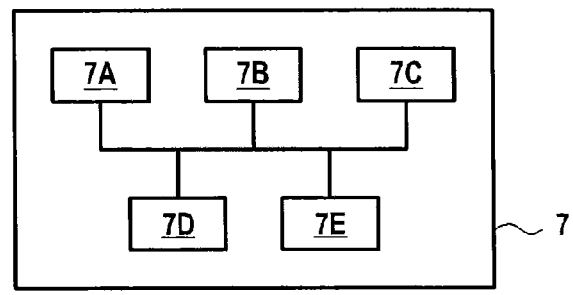

In the presently-described embodiment, the normalization device 6 and the construction device 7 both have the hardware architecture of a computer, as shown respectively in FIGS. 2A and 2B.

Thus, with reference to FIG. 2A, the normalization device 6 comprises in particular a processor 6A, a random access memory (RAM) 6B, a ROM 6C, a non-volatile flash memory 6D, and communications means 6E, optionally shared with other units of the computer of the engine 2.

The communications means 6E include data links to the sensors 4 of the engine 2, such as for example a digital data bus, enabling the normalization device 6 to obtain the measurements required by the sensors 4 and to derive therefrom the values of the monitored operating parameters P1, P2, . . . , PN. These communications means also include means for exchanging data with the construction device 7 (e.g. a wireless connection if the devices 6 and 7 are not colocated), in particular for the purpose of enabling the device 6 to obtain regression models as constructed by the device 7.

The ROM 6C of the normalization device 6 constitutes a data medium of the invention that is readable by the processor 6A and that stores a computer program of the invention, including instructions for executing steps of a normalization method of the invention as described below with reference to FIG. 4, in a particular implementation.

In equivalent manner, the computer program defines functional software modules of the normalization device 6, and more precisely first and second normalization modules for normalizing the values of the operating parameters relative to the set of exogenous variables X1, ..., XL, an association module for associating operating parameter values with one or more classes of a set of value vector classes predefined using a predetermined classification criterion, and a construction module for constructing regression models from predetermined models. The specific functions of these various modules appear more clearly below in the description of the steps of the normalization method of the invention given with reference to FIG. 4.

In similar manner, with reference to FIG. 2B, the construction device 7 comprises a processor 7A, a RAM 7B, a ROM 7C, a non-volatile flash memory 7D (storing the training database 8), and communications means 7E. These communications means 7E include a data link to the airplane 3, enabling the construction device 7 to obtain the measurements required by the sensors 4 and 5 and/or the values of the monitored operating parameters P1, P2, ..., PN that are added to the panel of data stored in the database 8.

The ROM 7C of the construction device 7 constitutes a data medium of the invention that is readable by the processor 7A and that stores a computer program of the invention including instructions for executing certain steps of the normalization method of the invention as described below with reference to FIG. 3.

In equivalent manner, the computer program defines functional software modules of the construction device 7, and more precisely construction modules for constructing regression models on the space generated by the exogenous variables X1, ..., XL on the basis in particular of the training data stored in the database 8, a normalization module, and a distribution module for distributing values in value vector classes. The specific functions of these various modules appear more clearly below in the description of the steps performed during a preliminary training stage of the normalization method of the invention, given with reference to FIG. 3.

It should be observed that in the presently-described embodiment, the normalization device 6 and the construction device 7 are not colocated. In a variant, these two devices could be implemented within the same piece of physical equipment on board the aircraft or situated in a device on the ground.

Figure 3:
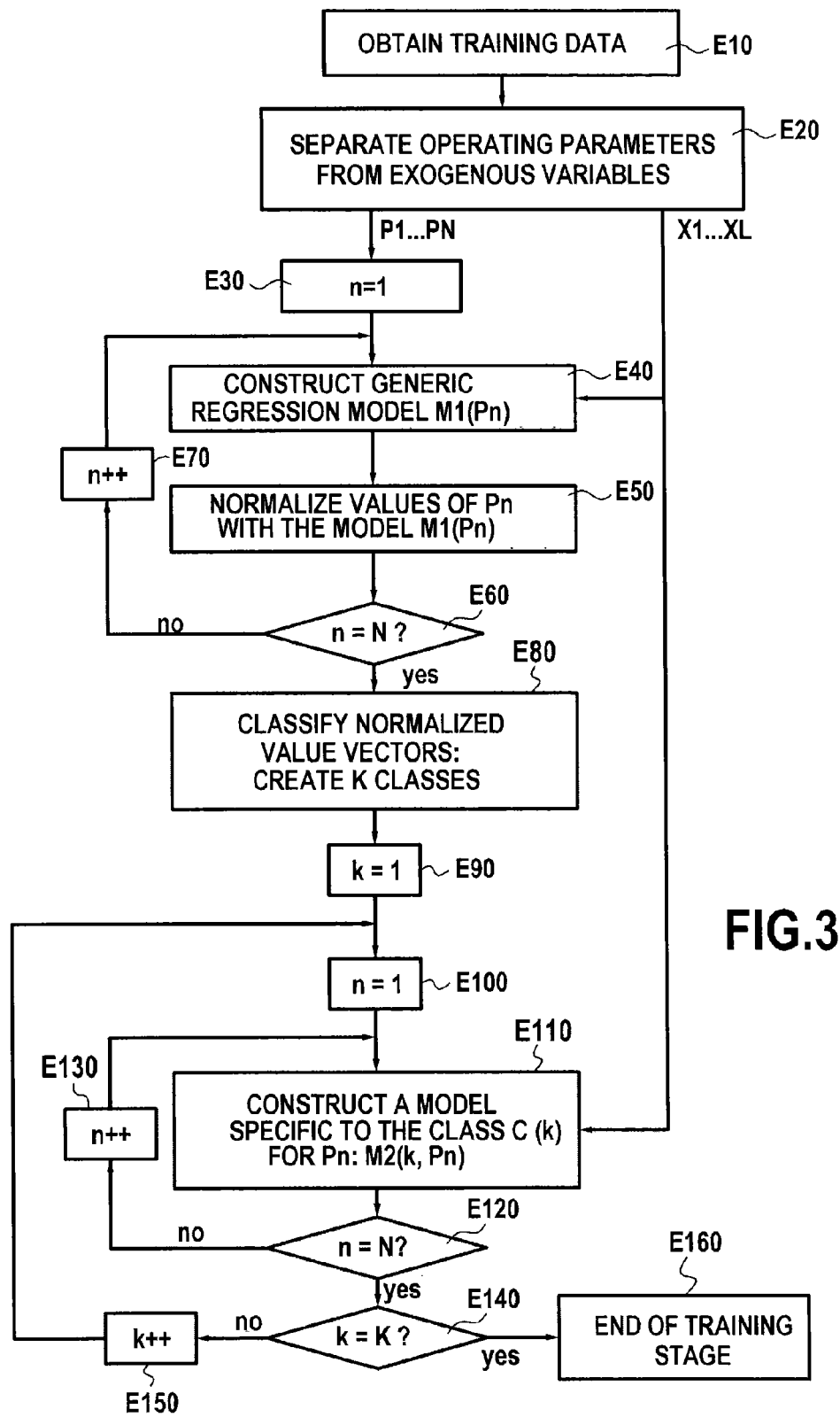
FIG. 3 is a flow chart showing the main steps of a preliminary training stage as performed by the construction device of FIG. 1 in order to prepare regression models for use by the normalization device of FIG. 1.
Figure 4:
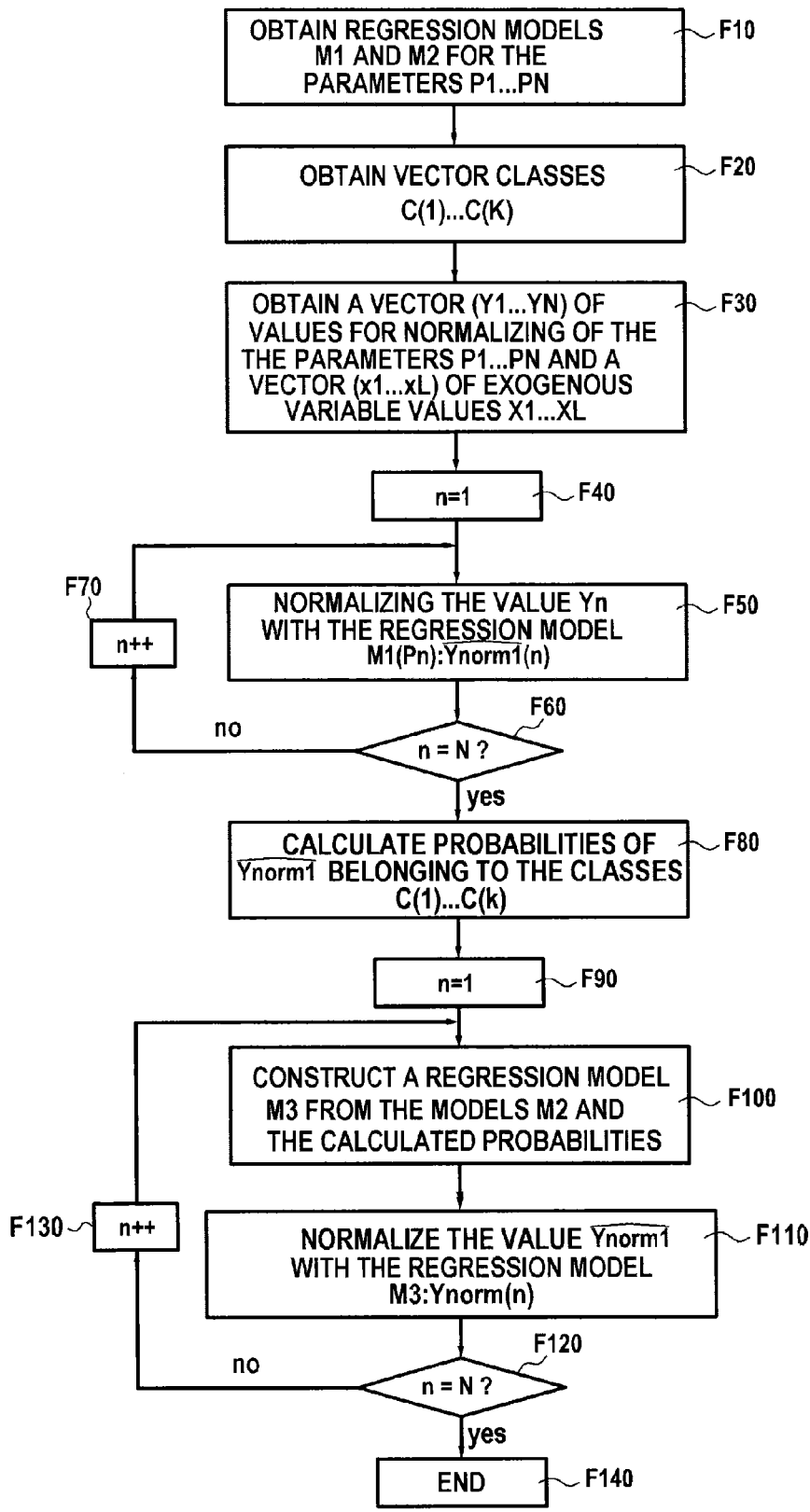
FIG. 4 is a flow chart showing the main steps of a normalization method of the invention as performed by the FIG. 1 normalization device in a particular implementation.

With reference to FIGS. 3 and 4 there follows a description of the main steps of a normalization method of the invention, in a particular implementation in which the method is performed by the system 1 of FIG. 1 to normalize a vector Y of values Y1, ..., YN of operating parameters P1, ..., PN, the values Y1, ..., YN representing the state of the engine 2 at a given instant. The values Y1, ..., YN that are being processed are referred to as "current" values. These values are determined from measurements taken by the sensors 4 in conventional manner, not described herein.

In the presently-described implementation, the method of normalizing the vector of current values Y1, ..., YN comprises:

a preliminary "training" stage as shown in FIG. 3, performed in this example by the construction device 7, during which the device constructs a plurality of regression models and defines a set of value vector classes for the vector of parameters P1, ..., PN on the basis of training data (also referred to herein as "observations" in order to provide a better distinction from the current values Y1, ..., YN) stored in the training database 8; and an "execution" stage shown in FIG. 4 that is performed in this example by the normalization device 6, in which stage the normalization device 6 normalizes the values Y1, ..., YN of the operating parameters P1, ..., PN using regression models and value vector classes as defined by the construction device 7. This execution stage can be performed in real time after acquiring the current values Y1, ..., YN. In a variant, it may be performed in deferred manner.

With reference to FIG. 3, the construction device 7 includes in its training database 8, a large number (denote W, W≥1) of training data comprising observations (or observed values) of the parameters P1, ..., PN and observations (or observed values) of the exogenous variables X1, ..., XL corresponding to the acquisition conditions of the W observations of the operating parameters. These various observations (operating parameters and exogenous variables) have been acquired over a plurality of engines similar to the engine 2 (including the engine 2) using sensors identical to the sensors 4 and 5, and over a plurality of missions (step E10).

In this panel of data, the construction device 7 separates the observations of exogenous variables X1, ..., XL from the observations of operating parameters P1, ..., PN, i.e. from the values of endogenous variables specific to the engines (step E20). In the description below, the W observations of each operating parameter Pn, n=1, ..., N are written Zi(n), i=1, ..., W, and the W observations of each exogenous variable Xl, l=1, ..., L are written Ui(l), i=1, ..., W, which observations Ui(l) represent the acquisition conditions for the observations Zi(n), i=1, ..., W stored in the training database 8 (W is an integer, and in a variant implementation it need not be the same from one parameter Pn to another).

In this example, the observations of the N operating parameters and the observations of the L exogenous variables having an influence on these operating parameters are acquired simultaneously or quasi-simultaneously during a mission. The observations of the exogenous variables are thus common over this mission for the various operating parameters P1, ..., PN.

Thereafter, the construction device 7 uses its construction module to construct (i.e. create), for each operating parameter Pn, n=1, ..., N (steps E30, E60, and E70), a first regression model written M1(Pn) on the space E(X1, ..., XL) generated by the set of exogenous variables X1, ..., XL (step E40). For this purpose, it uses the observations Zi(n), i=1, ..., W of the operating parameter Pn and the observations Ui(l), l=1, ..., W and l=1, ..., L of the exogenous variables X1, ..., XL stored in the training database 8 for this parameter Pn, as separated in step E20.

More precisely, in the presently-described implementation, the model M1(Pn) is a linear regression model (this example is not limiting, the model could be a regression of some other type). The construction module of the construction device 7 then determines a model M1(Pn) having the form:

$$M1(Pn)(X1, \ldots, XL) = \beta_0 + \beta_1 X1 + \ldots + \beta_L XL$$

where $\beta_0, \beta_1, \ldots, \beta_L$ are real numbers. The way in which the construction module determines the linear regression model M1 from the training data available in the database 8 (observations of parameters and of exogenous variables) presents no difficulty for the person skilled in the art. It is possible to use conventional algorithms or techniques similar to those described in particular in the Document EP 2 376 988 or in the Document by J. Lacaille entitled "Standardized failure signature for a turbofan", IEEE Aerospace Conference, Big Sky, Mont., 2009.

Once the model M1(Pn) has been constructed for the parameter Pn, the construction device 7 uses its normalization module to normalize the observations Zi(n), i=1, ..., W of the operating parameter Pn relative to the exogenous variables X1, ..., XL (step E50). In the presently-described implementation, this normalization consists in evaluating the normalized value $\widehat{Znorm}\_i(n)$ of the observation Zi(n) with the help of the following expression:

$$\widehat{Znorm}\_i(n) = \overline{Z}(n) - (Zi(n) - \hat{Z}i(n))$$

where $\overline{Z}(n)$ designates the mean of the observations Zi(n) of the parameter Pn, i=1, ..., W stored in the database 8 (i.e. the mean calculated over the W stored values), and $\hat{Z}i(n)$ is a prediction (estimate) for the value Zi(n) calculated with the help of the model M1 and of the observations Ui(l), l=1, ..., L corresponding to the acquisition conditions of the value Zi(n). In other words, $\hat{Z}(n)$ is the projection using the regression model M1 of the value Zi(n) onto the space of the exogenous variables E(X1, ..., XL), i.e.:

$$\hat{Z}i(n) = M1(Pn)(X1 = Ui(1), X2 = Ui(2), \ldots, XL = Ui(L))$$

The steps E40 of constructing the regression model M1 and E50 of normalization are reiterated for each operating parameter Pn, n=1, ..., N.

Once the N operating parameters have been processed, the construction device 7 has W vectors $\widehat{Znorm}\_i$, i=1, ..., W in which the N components are the N normalized observed values $\widehat{Znorm}\_i(n)$ of the operating parameters P1, ..., PN (each vector is made up of the normalized observed values $\widehat{Znorm}\_i(n)$, n=1, ..., N of the N operating parameters that were acquired simultaneously or quasi-simultaneously).

Thereafter, the construction device 7 uses its distribution module to distribute (i.e. classify) the W vectors, $\widehat{Znorm}\_i$, i=1, ..., W as a function of a predetermined classification criterion into K classes of value vectors defined for the parameters P1, P2, ..., PN and written C(1), C(2), ..., C(K) (step E80).

In the presently-described implementation, this distribution is intended to comply with a resemblance criterion between the vectors within a given class, in other words, vectors are distributed in the same class if they resemble one another by the values of their components and if they are close in the meaning of a predefined distance (e.g. a Euclidean distance), or more generally in the meaning of a predefined criterion.

To this end, the distribution module of the construction device 7 in this example makes use of a known unsupervised technique for classifying the vectors of normalized observations $\widehat{Znorm}\_i$, i=1, ..., W that is based for example on a Kohonen self-organizing map.

In a manner known to the person skilled in the art, such a technique relies on a neural network and is based on unsupervised training that enables a map of neighborhoods to be created, i.e. a map of vector classes that are neighboring (i.e. close), and also known as "clusters". Each class C(k) as defined in this way is associated with a representative (i.e. an N-dimensional vector), also known as its "signature" or its "best matching unit" (BMU), written Rk.

The representative Rk of a class C(k) is the barycenter (center of gravity) of the vectors of the class. It represents the mean behavior of the elements of the class C(k). This representative advantageously enables the person skilled in the art to identify quickly what distinguishes the vector classes C(k), k=1, ..., K (e.g. by using a histogram). Where necessary, this may make it possible to group together a plurality of vector classes that resemble one another into "metaclasses" of greater density, with the help of a similarity criterion based on experience, rather than a distance criterion.

The quality of the map as created in this way is estimated with the help of a quality measurement. In this example, the quality measurement is a quantification error measurement defined for each class as the mean distance between each vector of normalized observations attached to the class and the representative of the class.

In this example, the construction device 7 defines both the number K of vector classes and also the vector classes C(1), C(2), ..., C(K) dynamically in such a manner as to minimize this quantification error.

It should be observed that no limit is attached to the classification technique used during the distribution step E80 for distributing the vectors $\widehat{Znorm}\_i$ of normalized observed values into K classes of values, and it is possible to envisage using other algorithms in a variant for performing this distribution. Thus, the distribution module may make use of other techniques for unsupervised classification (or self-organized mapping (SOM)), or on the contrary it may use a supervised technique as mentioned above (e.g. a technique involving the K closest neighbors). It is also possible to define other classification criteria for performing this technique, i.e. the vectors distributed in a given class may share a common characteristic, e.g. they may represent values acquired from sensor measurements taken on a given engine.

Once the normalized observation vectors $\widehat{Znorm}\_i$, i=1, ..., W have been distributed into K classes C(1), C(2), ..., C(K), the construction device 7 uses its construction module to construct (i.e. create) for each class C(k), k=1, ..., K (steps E90, E140, and E150), and for each operating parameter Pn, n=1, ..., N (steps E100, E120, and E130), a second regression model M2(k,Pn) on the space E(X1, ..., XL) generated by the set of the exogenous variables X1, ..., XL (step E110). It can thus readily be understood that since the models M2(k,Pn) defined on each class C(k) for the parameter Pn, k=1, ..., K, are specific to each class, they are more accurate than the model M1(Pn), which is referred to as being "generic".

In the presently-described implementation, the models M2 are linear regression models (this example is not limiting, and regression models of some other type could be used), satisfying:

$$M2(k,Pn)(X1, \ldots, XL) = \gamma_0 + \gamma_1 X1 + \ldots + \gamma_L XL$$

where $\gamma_0, \gamma_1, \ldots, \gamma_L$ designate real numbers. The construction module of the device 7 defines the models M2 in similar manner to defining the model M1, while restricting itself to the class under consideration.

The construction device 7 reiterates step E110 so as to construct a distinct model M2 for each class C(k), k=1, ..., K and for each operating parameter Pn, n=1, ..., N.

Once the models M2(k,Pn), k=1, ..., K, n=1, ..., N have been constructed for each class and for each operating parameter, the training stage has been completed (step E160).

It should be observed that during the training stage, and in particular when unsupervised classification techniques are used, it is not always clear how to control the distribution of the normalized observation vectors $\widehat{Znorm}\_i$ among the vector classes C(1), C(2), ..., C(K), and in particular how to make sure that the defined classes of value vectors present sufficient density to guarantee robustness for the constructed models M2(k,Pn) (certain classes may be composed of a few vectors, whereas other classes may be very dense). To mitigate that problem, the number of classes may be reduced, or a plurality of classes may be grouped together into classes of greater density, referred to as "metaclasses", and a model M2 may be constructed that is specific to such a metaclass instead to any one of the classes as initially determined. As emphasized above, this may be done by taking account of a similarity criterion between the representatives of the classes, based on experience, or in a variant based on a distance criterion between the representatives.

With reference to FIG. 4, there follows a description of how the normalization device 6 makes use of the regression models M1(Pn), M2(k,Pn) and the value classes (Ck), k= 1, ..., K and n=1, ..., N as determined by the construction device 7.

The models M1(Pn) and M2(k,Pn), and the value classes (Ck), k=1, ..., K and n=1, ..., N as determined by the construction device 7 during the training stage are delivered to the normalization device 6 (steps F10 and F20) by means of an exchange between the communications means 7E of the construction device 7 and the communications means 6E of the normalization device 6. The normalization device 6 stores these models and value classes, e.g. in its non-volatile memory 6E.

It is assumed below that the normalization device 6 receives a vector Y=(Y1, ..., YN) of values for operating parameters P1, ..., PN to be normalized as determined from measurements taken by the sensors 4, and also a vector x=(xl, ..., xL) of values of exogenous variables (X1, ..., XL) as collected by the sensors 5 and representing the external context during acquisition by the sensors 4 of the values (Y1, ..., YN) of the operating parameters P1, ..., PN (or the values that were used to determine the values Y1, ..., YN) (step F30). It should be observed that in the presently-described implementation, the values of the exogenous variables are the same for all of the operating parameters P1, ..., PN, with the values of the operating parameters and the values of the exogenous variables all being acquired at the same time during the mission.

In the presently-described implementation, each value Yn, n=1, ..., N is initially normalized separately, one after another or with the help of processes executed in parallel by the normalization device 6 (steps F40, F60, and F70). In yet another variant, it is possible to envisage using vector processing for normalizing the N values Yn, n=1, ..., N simultaneously.

More precisely, for each index n=1, ..., N, the normalization device 6 uses its first normalization module to normalize the value Yn of the parameter Pn relative to the exogenous variables X1, ..., XL using the regression model M1(Pn). In the presently-described implementation, this normalization consists in evaluating the normalized value $Y\widehat{norm}1(n)$ using the following expression (step F50):

$$Y\widehat{norm}1(n)=\overline{Z}(n)-(Yn-ZM1(n))$$

where, it should be recalled, $\overline{Z}(n)$ designates the mean of the observations Zi(n), i=1, ..., W stored in the training database 8, and ZM1(n) is a prediction (estimate) for the value Yn, as calculated using the model M1 and the observations xl, l=1, ..., L, corresponding to the acquisition conditions for the value Y(n) (exogenous variables). In other words, ZM1(n) is the projection using the regression model M1 of the value Yn onto the space of the exogenous variables E (X1, ..., XL), i.e.:

$$ZM1(n)=M1(Pn)(X1=x1,X2=x2,\ldots,XL=xL)$$

This first normalization step F50 is performed for each parameter Pn, n=1, ..., N so as to obtain a vector $\widehat{norm}1$ in which the N components are the normalized values $\widehat{norm}1(n)$, n=1, ..., N.

The normalization device 6 then uses its association module to associate the normalized value vector $\widehat{norm}1$ with one or more classes from among the K classes of vectors C(k), k=1, ..., K as defined by the construction device 7 and as stored in the non-volatile memory 6E.

For this purpose, in the presently-described implementation, it estimates the probabilities pk of the vector of normalized values $\widehat{norm}1(n)$ belonging to the classes of values C(k), k=1, ..., K, each class C(k) being represented by its representative Rk as mentioned above (step F80). These probabilities pk, k=1, ..., K are defined in this example as follows:

$$pk = \frac{\exp(-\|Y\widehat{norm}1 - Rk\|^2)}{\sum_{i=1}^{K} \exp(-\|Y\widehat{norm}1 - Ri\|^2)}$$

where $\|A-B\|^2$ represents the square of the Euclidean distance between the vectors A and B.

The normalized value vector $\widehat{norm}1$ is thus associated by the normalization device 6 with each class C(k), k=1, ..., K, with probability pk.

In a variant, the normalization device 6 associates a single class of value vectors from among the K classes of values C(k), k=1, ..., K to the vector $\widehat{norm}1$, for example the class corresponding to the greatest probability pk, or the class for which the representative is the closest to the normalized value vector $\widehat{norm}1$, e.g. in the Euclidean distance meaning.

Thereafter, the normalization device 6 uses its construction module to construct (i.e. create) for each operating parameter Pn, n=1, ..., N (steps F90, F120, and F130) a regression model M3(Pn) on the space E(X1, ..., XL) generated by the exogenous variables X1, ..., XL (third regression model in the meaning of the invention) (step F100). For this purpose, in this example use is made of the probabilities pk together with the specific regression models M2(k,Pn), k=1, ..., K stored in its non-volatile memory 6E.

More precisely, the regression model M3(Pn) for the operating parameter Pn is defined as follows:

$$M3(Pn)(X1, \ldots, XL) = \sum_{k=1}^{K} pk \times M2(k, Pn)(X1, \ldots, XL)$$

In other words, M3 is constructed from the sum of the regression models M2(k,Pn) as defined over the classes C(1), ..., C(K) weighted by the probabilities pk of the normalized value vector $Y\widehat{norm}1$ belonging to the classes.

In a variant, if a single class C(k0) is associated with the vector $\overline{Y\widehat{norm}1}$, the model M3 is taken as being equal to the regression model M2(k0,Pn).

Thereafter, using its second normalization module, the normalization device 6 normalizes the normalized value $Y\widehat{norm}1(n)$ of the operating parameter Pn relative to the exogenous variables X1, . . . , XL using the regression model M3 as constructed in this way (step F110).

More precisely, during this second normalization step F110 it evaluates the normalized value Ynorm(n) using the following expression:

$$Y\text{norm}(n)=\overline{Y\text{norm}}(n)-(Y\widehat{\text{norm}}1(n)-ZM3(n))$$

where ZM3(n) is a prediction (estimate) of the normalized value $Y\widehat{norm}1(n)$ calculated using the model M3 and the observations xl, l=1, . . . , L (exogenous variables) corresponding to the acquisition conditions for the value Yn. In other words, ZM3 (n) is the projection using (according to) the regression model M3 of the value $Y\widehat{norm}1(n)$ on the exogenous variable space E(X1, . . . , X1), i.e.:

$$ZM3(n)=M3(Pn)(X1=x1,X2=x2,\ldots,XL=xL)$$

Furthermore:

$$\overline{Y\text{norm}}(n) = \sum_{k=1}^{K} pk \cdot \left( \frac{1}{\text{Card}(C(k))} \sum_{l \in C(k)} \widehat{Z\text{norm}}\_i(n) \right)$$

designates the sum over the classes C(1), . . . , C(K) of the means of the normalized observed values of the parameter Pn of the vectors of these classes (i.e. distributed into these classes during the step E80 of the training stage, written "i∈C(k)" in the above expression) weighted by the probabilities pk of belonging to the classes C(1), . . . , C(K).

In a variant, when a single class C(k0) is associated with the vector $Y\widehat{norm}1$, the variable $\overline{Y\text{norm}}(n)$ designates the mean of the normalized observed values of the parameter Pn of the vectors of this class (determined during the step E80 of the training stage).

The steps F100 and F110 are performed by the normalization device 6 for each operating parameter Pn, n=1, . . . , N (steps F120 and F130) giving rise to a vector of normalized values Ynorm=(Ynorm(1), . . . , Ynorm(N)) of the operating parameters P1, . . . , PN (step F140).

The normalized vector Ynorm obtained at the end of the step F140 is a vector of standardized values for the parameters P1, . . . , PN that can be used for monitoring the engine 2 and that advantageously no longer depends on the conditions under which the current values of the parameters P1, . . . , PN are acquired.

The invention claimed is:

1. A normalization method for normalizing current values of N operating parameters of an aeroengine, where N is an integer greater than or equal to 1, said current values being for use in monitoring the aeroengine and being determined on the basis of measurements delivered by sensors of the aeroengine, the normalization method comprising:
    a first normalization step of normalizing the current value of each operating parameter relative to a set of exogenous variables representative of an external context having an influence on the operating parameter, using a first regression model defined for the operating parameter on a space generated by the set of exogenous variables;
    an association step of associating a vector formed by the normalized current values of the N operating parameters with at least one class of a set of value vector classes predefined for the N operating parameters;
    a construction step of constructing, for each operating parameter, a third regression model defined on the space generated by the set of exogenous variables by using at least one second regression model defined on the space generated by the set of exogenous variables for said at least one class associated with said vector;
    a second normalization step of normalizing the normalized current value of each operating parameter relative to the set of exogenous variables, using the third regression model constructed for the operating parameter; and
    a detecting step of detecting a failure of the aeroengine based on the normalized current value of each operating parameter relative to the set of exogenous variables,
    wherein the association step comprises estimating for said at least one class a probability of the vector formed by the normalized current values of the N operating parameters belonging to the class, and
    wherein the third regression model is constructed from the sum of each second regression model defined for a class and weighted by the probability of the vector formed by the normalized current values of the N operating parameters belonging to the class.

2. A normalization method according to claim 1, wherein the first regression models defined for the N operating parameters are constructed during a preliminary training stage from a plurality of observed values of the N operating parameters determined from measurements of sensors of a plurality of aeroengines and collected during at least one mission of the aeroengines.

3. A normalization method according to claim 2, wherein the preliminary training stage further comprises, after constructing the first regression models:
    a normalization step of normalizing said plurality of observed values of the operating parameters relative to the set of exogenous variables using the first regression models defined for the operating parameters, the normalization step giving rise to a plurality of vectors of normalized observed values of the N operating parameters;
    a distribution step of distributing the vectors in said set of value vector classes; and
    a construction step of constructing second regression models defined for each operating parameter and for each class on the basis of vectors of normalized observed values of the operating parameter as distributed in the class.

4. A normalization method according to claim 3, wherein the distribution step performs an unsupervised classification method relying on a self-organizing map and resulting in the definition of the classes of said set of value vector classes.

5. A normalization method according to claim 1, wherein at least one of the first, second, or third regression models is a linear regression model.

6. A computer program including instructions for executing steps of the normalization method according to claim 1 when said program is executed by a computer.

7. A computer readable data medium storing a computer program including instructions for executing steps of the normalization method according to claim 1.

8. A normalization device for normalizing current values of N operating parameters of an aeroengine, where N is an integer greater than or equal to 1, said current values being for use in monitoring the aeroengine and being determined on the basis of measurements delivered by sensors of the aeroengine, the normalization device comprising:

a first normalization module for normalizing the current value of each operating parameter relative to a set of exogenous variables representative of an external context having an influence on the operating parameter, using a first regression model defined for the operating parameter on a space generated by the set of exogenous variables;

an association module suitable for associating a vector formed by the normalized current values of the N operating parameters with at least one class of a set of value vector classes predefined for the N operating parameters;

a construction module suitable for constructing, for each operating parameter, a third regression model defined on the space generated by the set of exogenous variables using at least one second regression model defined on the space generated by the set of exogenous variables for said at least one class associated with said vector;

a second normalization module for normalizing the normalized current value of each operating parameter relative to the set of exogenous variables, using the third regression model for the operating parameter as constructed by the construction module; and a detection module for detecting a failure of the aeroengine based on the normalized current value of each operating parameter relative to the set of exogenous variables, wherein the association module estimates for said at least one class a probability of the vector formed by the normalized current values of the N operating parameters belonging to the class, and wherein the construction module constructs the third regression model from the sum of each second regression model defined for a class and weighted by the probability of the vector formed by the normalized current values of the N operating parameters belonging to the class.

9. A turbine engine including a normalization device according to claim 8.

10. A construction device for constructing regression models for use in normalizing values of N operating parameters of an aeroengine relative to a set of exogenous variables representative of an external context having an influence on the operating parameters, the construction device comprising:

a construction module for constructing for each operating parameter a first regression model on a space generated by said set of exogenous variables from a plurality of observed values of the operating parameter as determined from measurements of sensors of a plurality of aeroengines and collected during at least one mission of the aeroengines;

a normalization module for normalizing the plurality of observed values of the N operating parameters relative to the set of exogenous variables using first regression models as constructed for the operating parameters by the construction module, said normalization module being suitable for delivering a plurality of normalized observed value vectors of the N operating parameters;

a distribution module for distributing the vectors in a set of value vector classes;

a construction module for constructing for each value vector class and for each operating parameter a second regression model on the space generated by the set of exogenous variables from the normalized observed value vectors distributed in said class; and a detection module for detecting a failure of the aeroengines using the first and second regression models, wherein the normalization module estimates for at least one of the normalized observed value vectors a probability of the vector formed by the normalized observed values of the N operating parameters belonging to the at least one of the normalized observed value vectors, and wherein the construction module constructs the third regression model from the sum of each second regression model defined for a class and weighted by the probability of the vector formed by the normalized current values of the N operating parameters belonging to the class.

11. A normalization system for normalizing current values of N operating parameters of an aeroengine, N being an integer greater than or equal to 1, said current values being for use in monitoring the aeroengine and being determined from measurements delivered by sensors of the aeroengine, the system comprising:

a construction device for constructing first and second regression models for the N operating parameters; and a normalization device according to claim 8, suitable for using the first and second regression models constructed by the construction device to normalize the current values of the N operating parameters.

\* \* \* \* \*